United States Patent Office 2,807,929
Patented Oct. 1, 1957

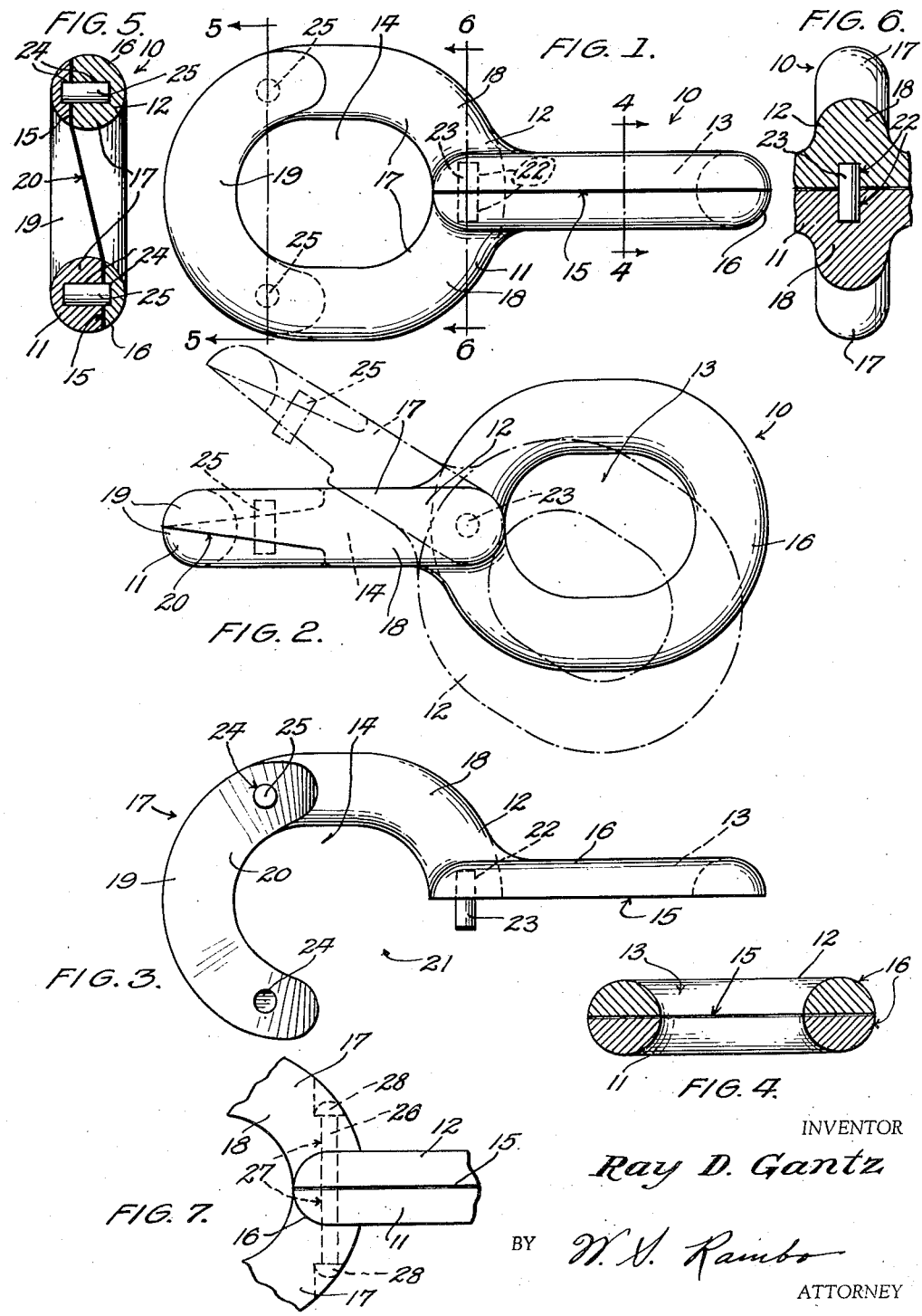

2,807,929

CHAIN LINK COMPOSED OF TWO IDENTICAL PARTS, EACH PART HAVING A HOOK PORTION AND A LOOP PORTION RELATIVELY PERPENDICULARLY DISPOSED

Ray D. Gantz, Columbus, Ohio, assignor to The Carroll Chain Company, Columbus, Ohio, a corporation of Ohio Application January 18, 1955, Serial No. 482,499

2 Claims. (Cl. 59—87)

This invention relates to chain link construction and, more particularly, to unwelded chain link construction in which each of the individual links is formed to embody eye-formations arranged in relatively prependicular planes.

Heretofore, each of such unwelded chain links has been formed ordinarily to comprise a single integral body of metal in which the relatively perpendicularly disposed eyes are formed, as in the construction of sash chain, used to counterbalance window sash weights, suspend advertising signs and in various other capacities. While such chain construction is adequate in meeting the needs of light service, the same are not adaptable for relatively heavy strain and wear-producing types of service. Normally, in such heavy duty service it is a common practice to use chain in which closed links of an endless welded form are provided. Welded chain links are difficult and costly to produce by hand methods, and when formed by machines usually require sizable capital investments in physical equipment and with limitations on the size of the links.

Accordingly, it is an outstanding object of the present invention to provide an improved unwelded chain link construction for service in relatively heavy duty and other capacities, and one wherein each link is composed of a pair of completely separable sections which, when in assembled order, provide in the resultant composite link one constantly closed and one openable link-receiving eye formation, the respective eye formations of each link being disposed in different planes.

Another object of the invention is to provide an unwelded composite chain link wherein each link comprises a pair of rigid, intergral, longitudinally extending and normally coinciding sections, the latter having inner, flat, meeting surfaces and rounded outer surfaces, the link sections defining eye formations arranged in relatively perpendicular order.

A further object is to provide an unwelded composite chain link of the character indicated in which the separate link sections thereof, at the region of juncture of the perpendicularly disposed eye formations, are joined for relative turning movement about an axis provided by pivot pin and socket means formed with the sections, whereby to provide means for admitting of relative swinging movement of the link sections between open and closed positions, so that said sections may be relatively disposed to enable complemental chain-forming links to be inserted in their openable eye formations, and yet be positively retained in link-forming order when the sections are moved to normal positions of relative registry and eye closure.

A still further object is to provide an improved composite chain link having eye formations disposed in different planes, and wherein the link comprises a pair of separable sections of cast or drop-forged metal, the sections being so formed and united as to facilitate their assembly into multiple link chains.

For a further understanding of the invention, reference may be had to the following description and the accompanying drawing, wherein:

Fig. 1 is a side elevational view of a composite chain link when formed in accordance with the features of the present invention;

Fig. 2 is a top plan view of the link, disclosing by broken lines one of the link sections when moved to an eye-opening position;

Fig. 3 is a side elevational view of one of the link sections;

Fig. 4 is a transverse sectional view taken substantially on the plane indicated by the line 4—4 of Fig. 1;

Fig. 5 is a similar view on the line 5—5 of Fig. 1;

Fig. 6 is also a transverse vertical sectional view taken through the link on the line 6—6 of Fig. 1;

Fig. 7 is a fragmentary side elevational view showing a modified form of pivotal union between the sections of the link.

Referring more particularly to the drawings, the composite chain link 10 of the present invention is composed of a pair of separate link-forming sections, as indicated at 11 and 12. These sections when in their assembled order, as shown in full lines in Figs. 1 and 2, are cast, forged or otherwise fastened to provide a continuous, closed eye formation 13 at one end of each link, and an openable, discontinuous, eye formation 14 at the opposite end of said link. The link sections are each formed to provide substantially flat, inner, and relatively engaging surfaces, as indicated at 15, and rounded substantially semi-circular outer surfaces 16, so that the links, when assembled, as in Figs. 4 and 5, will possess a substantially circular cross-sectional configuration.

The discontinuous, openable eye formation 14 of the composite link 10 is produced by forming each of the sections 11 and 12 to include at one end thereof an arcuate hook-shaped extension 17. Each of these extensions includes a shank 18 of semi-circular or secant cross-sectional formation, each shank being integrally joined with and projecting outwardly and laterally from one end of the associated ring formation 13 constituting the closed eye of the link section. The outer end of each shank 18 terminates in an arcuate finger 19 which possesses, preferably, a semi-circular configuration when viewed from the side, as in Figs. 1 and 3 of the drawings. Each of these fingers progressively decreases, as at 20, in thickness from its region of joinder with its associated shank 18 to its extreme outer end. By reference to Fig. 3, it will be noted that an open mouth 21 is formed between the extreme outer end of each finger 19 and the body of the closed ring associated eye formation 13, said mouth permitting of the connection of other correspondingly formed links to form a complete chain of desired length.

To enable the link sections to be of duplicative formation, in order to avoid the need for producing right and left sections in link assemblies, I provide the sections with pin and socket type registry-maintaining means. As shown in Figs. 1 and 3, the link sections 11 and 12 have their flat surfaces 15, at positions contiguous to the regions of juncture provided between the inner ends of the shanks 18 and the continuous eye formations 13, formed with openings 22 for the reception in this instance of a straight cylindrical pivot pin 23. As indicated in Fig. 2, the link sections may turn bodily about the long axis of the pin 23, so that the eye formation 14 may be opened to enable cooperative chain links, not shown, to be inserted into or removed from the formation 14. Also, the arcuate fingers 19 of the hook-like extensions 17 are formed with openings 24 for the reception of dowel-type position-determining pins 25. One of the openings 24 is located, as shown in Fig. 3, adjacent to the outer end of the finger 19 in which the opening is formed, while the other opening 24 in the same finger is disposed adjacent the outer region of the associated shank 18.

By this use of these pin and socket connections, the same are readily adapted to the assembly of the duplicate link sections for registry-maintaining purposes. Each of the link sections corresponds constructionally to the configuration of its mating link section to simplify manufacture of the complete link, particularly by avoiding right and left pieces. The sockets or openings 22 and 24 are formed in the link sections or pieces in a manner permitting of the ready insertion of the pins or dowels 23 and 25, preferably by press-fitting operations, thereby avoiding the use of added pin-fastening or retaining means.

With this construction, the upper link section 12, as the parts are viewed in Fig. 1, may be turned about the vertical axis of the pin 23 and separated from the finger 19 of the extension 17 of the lower section 11, as indicated by broken lines in Fig. 2. This operation results in the opening of the mouth 21 of the eye formation 12 so that the link may be joined with like links or other connecting means.

In the modification shown in Fig. 7, in lieu of using the dowel pin 23 as a fulcrum in pivotally uniting the link sections, I may employ in lieu thereof a rivet-type pin 26 which passes completely through aligned openings 27 in the intermediate part of the assembled link, the pin 26 having headed ends 28 for retaining the pin in position and precluding undue separation of the sections of the link.

In view of the foregoing it will be evident that the present invention provides a composite link composed of originally separate, duplicative and mating sections in which eye formations, disposed in relatively perpendicular planes, are provided. By so forming the link the same may be readily and economically produced by conventional casting or forging operations and without the use of costly forming and welding machines heretofore employed in producing one-piece links having a pair of eye formations disposed in different planes.

I claim:

1. A composite, weldless chain link comprising a pair of originally separate link-forming sections of identical shape and size, each of said sections comprising an integral one-piece body formed at one end with a closed eye portion and at its opposite end with an open hook eye portion, the open hook eye portion being disposed in a plane perpendicular to the plane of the closed eye portion and said portions being merged and joined with one another at the intermediate portion of said body, the closed and open eye portions of each of said sections being formed with flat surfaces arranged for flat complemental engagement with like surfaces formed on the other of said sections, and the open hook eye portion of each of said sections being arranged to close the open hook eye portion of the other sections when said sections are positioned in relative registry with one another; and a pivot pin connecting said sections at the intermediate portions thereof and having an axis disposed in perpendicular relation to the plane of the closed eye portions of said sections and in parallel relation to the plane of the open hook eye portions of said sections, said sections being turnable relative to one another about said pivot pin to simultaneously move the open hook eye portions of said sections relatively apart in a vertical plane while sliding the closed eye portions of said sections relatively in a transverse plane.

2. A chain link as defined by claim 1, wherein the open hook eye portions of each of said sections vary progressively in cross sectional thickness toward the terminal end portions thereof, and said sections, when placed in registry with one another defining a circular cross-section.

References Cited in the file of this patent
UNITED STATES PATENTS

| | | |
|---|---|---|
| 219,465 | Hancox | Sept. 9, 1879 |
| 404,147 | Acklen | May 28, 1889 |
| 565,199 | Berger | Aug. 4, 1896 |
| 609,153 | Le Valley | Aug. 16, 1898 |
| 856,947 | Ecseghy | June 11, 1907 |
| 1,597,259 | Wilson | Aug. 24, 1926 |